United States Patent
Mine et al.

(10) Patent No.: US 11,393,614 B2
(45) Date of Patent: Jul. 19, 2022

(54) CURRENT LEAD ASSEMBLY FOR CRYOGENIC APPARATUS

(71) Applicant: General Electric Company, Schenectady, NY (US)

(72) Inventors: Susumu Mine, Niskayuna, NY (US); Minfeng Xu, Ballston Lake, NY (US); Anbo Wu, Clifton Park, NY (US); Paul St. Mark Shadforth Thompson, Stephentown, NY (US)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 16/804,645

(22) Filed: Feb. 28, 2020

(65) Prior Publication Data
US 2021/0272729 A1  Sep. 2, 2021

(51) Int. Cl.
*H01F 6/00* (2006.01)
*H02G 15/34* (2006.01)
*H01F 6/04* (2006.01)
*H01R 4/68* (2006.01)

(52) U.S. Cl.
CPC .............. *H01F 6/008* (2013.01); *H01F 6/04* (2013.01); *H01R 4/68* (2013.01); *H02G 15/34* (2013.01)

(58) Field of Classification Search
CPC . H01F 6/008; H01F 6/04; H01F 6/065; H01R 4/68; H02G 15/34
See application file for complete search history.

(56) References Cited

U.S. PATENT DOCUMENTS

| | | | |
|---|---|---|---|
| 5,623,240 | A | 4/1997 | Sakuraba et al. |
| 5,991,647 | A | 11/1999 | Brockenborough et al. |
| 7,928,321 | B2 | 4/2011 | Corsaro et al. |
| 9,182,464 | B2 | 11/2015 | Mine et al. |
| 9,746,533 | B2 | 8/2017 | Overweg et al. |

(Continued)

FOREIGN PATENT DOCUMENTS

WO    2017057760 A1    7/2018

OTHER PUBLICATIONS

Machine translation of Takeo [WO 2017057760] (Year: 2017).*

(Continued)

*Primary Examiner* — Bernard Rojas

(57) ABSTRACT

A current lead assembly for minimizing heat load to a conduction cooled superconducting magnet during a ramp operation is provided. The current lead assembly includes a vacuum chamber having a through hole to enable a first end of a current lead contact to remain outside the vacuum chamber and a second end of the current lead contact to penetrate within the vacuum chamber. A vacuum boundary wall is located between the vacuum chamber and the current lead contact. At least one superconducting magnet is arranged inside of the vacuum chamber and includes a magnet lead. A second end of the current lead contact is coupled to the magnet lead via an internal lead. A vacuum cap is removably disposed to sealingly encompass therein the first end of the current lead contact during a first state of operation. The first end of the current lead contact is arranged to contact a power supply during a second state of operation, wherein the contact occurs exterior the vacuum chamber.

20 Claims, 7 Drawing Sheets

(56) References Cited

U.S. PATENT DOCUMENTS

| | | | |
|---|---|---|---|
| 2004/0239462 A1* | 12/2004 | Nemoto | H01F 6/065 335/216 |
| 2011/0130293 A1* | 6/2011 | Kawashima | H01F 6/04 174/15.5 |
| 2014/0028316 A1* | 1/2014 | Mine | G01R 33/3815 324/318 |
| 2016/0187439 A1* | 6/2016 | Lvovsky | G01R 33/543 324/309 |
| 2016/0233011 A1* | 8/2016 | Eguchi | H01F 6/02 |
| 2017/0025850 A1 | 1/2017 | Rey et al. | |
| 2018/0330856 A1 | 11/2018 | Mine et al. | |
| 2019/0108933 A1 | 4/2019 | Urbahn et al. | |

OTHER PUBLICATIONS

Heiberger et al., "Design, Fabrication, and Testing of the Aliss Superconducting Mine-Countermeasures Magnet", Advances in Cryogenic Engineering, Newyork, vol. 43, pp. 149-156, 1998.

Hull et al., "High Temperature Superconducting Current Leads For Cryogenic Apparatus", Proceedings of the 24th Intersociety Energy Conversion Engineering Conference, USA, vol. 01, pp. 459-464, Aug. 6, 2002.

* cited by examiner

CURRENT LEAD ASSEMBLY FOR CRYOGENIC APPARATUS

STATEMENT REGARDING FEDERALLY SPONSORED RESEARCH & DEVELOPMENT

This invention was made with Government support under contract number 1 U01 EB 026976-01 awarded by National Institutes of Health (NIH), an agency of the U.S. Department of Health and Human Services. The Government has certain rights in the invention.

BACKGROUND

Superconducting magnets conduct electricity with effectively zero resistance as long as the magnets are maintained at a suitably low temperature, which is referred to as a "superconducting temperature" hereinafter. Cryogenic systems are used to ensure that the superconducting magnets work at the superconducting temperature.

Superconducting magnets generally comprise superconducting coils electrically coupled to a power supply through current leads for transmitting electrical current to the superconducting coils. These current leads each include one end electrically coupled to the superconducting coil, and another end electrically coupled to the power supply. The superconducting magnet is coupled to the power supply during a ramp operation to power or charge the magnet to a specified field, then put it into a persistent mode. Cryogenic devices, such as superconducting magnets, may require current ranging from a hundred to several thousand amperes to be brought into the cold region of the cryostat. Significant heat is generated from the current leads that may inevitably propagate to the superconducting coils. Therefore, current leads must be designed to minimize the heat flow or loss into the cold region.

Some current lead assemblies include demountable current leads where the connection to the power supply is terminated when the magnet is powered and placed in persistent mode by disengaging or demounting the contacts of the current leads.

The use of demountable current leads in a conduction cooled superconducting magnet system is complicated by the requirement for cooling the current lead that is coupled to the superconducting coils. In a conduction cooled superconducting magnet system, connection of the leads occurs in a vacuum chamber at low temperature, such as 50° K, for example. Electrical contacts made at these low temperatures in a vacuum, typically result in high contact resistance, possibly from frozen contaminants that are deposited to the contacts, as a result of outgassing of the materials in the vacuum. Connection at low temperatures also results in high resistance and high heat load because good contact is difficult to achieve since the contacts are very cold and rigid and have little compliance which makes it difficult to establish electrical contact. In addition, the leads are difficult to access from within the vacuum chamber for service.

It may therefore be desirable to develop a robust design for a current lead assembly for a superconducting magnet that advantageously eliminates the need to connect and disconnect the lead electrically and mechanically from within the vacuum chamber and does not result in high resistance and high heat load.

BRIEF DESCRIPTION

In accordance with aspects of the present disclosure, a current lead assembly for a superconducting magnet is presented. The current lead assembly includes a vacuum chamber having a through hole, a current lead contact sealably penetrating the vacuum chamber via the through hole, a vacuum boundary wall between the vacuum chamber and the current lead contact, at least one superconducting magnet arranged inside of the vacuum chamber and having a magnet lead, at least one internal lead having one end coupled to the magnet lead and another end coupled to a second end of the current lead contact and a vacuum cap removably disposed on an outer surface of the vacuum chamber to sealingly encompass therein the first end of the current lead contact during a first state of operation. The current lead contact has a first end outside the vacuum chamber and a second end inside the vacuum chamber. The first end of the current lead contact is arranged to contact a power supply during a second state of operation. The contact occurs at ambient temperature, exterior the vacuum chamber upon removal of the vacuum cap.

In accordance with another aspect of the present disclosure, a method of fabricating a current lead assembly for superconducting magnet is presented. The method includes providing a vacuum chamber comprising a housing enclosing an interior volume and having at least one through hole, providing at least one superconducting magnet inside of the vacuum chamber and having a magnet lead, and arranging a current lead contact to sealingly penetrate the vacuum chamber via the through hole. A first end of the current lead contact is positioned outside the vacuum chamber and a second end of the current lead contact is positioned inside the vacuum chamber. The method further includes arranging a reentrant concentric tube assembly providing a vacuum boundary between the vacuum chamber and the current lead contact, attaching an internal lead between the magnet lead and the second end of the current lead contact, and removably disposing a vacuum cap on an outer surface of the vacuum chamber to sealingly encompass the first end of the current lead contact during a first state operation and provide contact outside the vacuum chamber of the first end of the current lead contact with a power supply upon removal of the vacuum cap during a second state of operation.

In accordance with yet another aspect of the present disclosure, a magnetic resonance imaging (MRI) system is presented. The MRI system includes at least one superconducting magnet that generates a magnetic field comprising a plurality of magnetic field gradients, a current lead contact sealably penetrating the vacuum chamber via the through hole, a reentrant concentric tube assembly providing a vacuum boundary between the vacuum chamber and the current lead contact, at least one internal lead having one end coupled to the magnet lead and another end coupled to a second end of the current lead contact, and a vacuum cap removably disposed on an outer surface of the vacuum chamber to sealingly encompass therein the first end of the current lead contact during a first state of operation. The at least one superconducting magnet having a magnet lead and arranged inside of a vacuum chamber enclosing a vacuum space and comprising a through hole. The current lead contact have a first end outside the vacuum chamber and a second end inside the vacuum chamber. The first end of the current lead contact is arranged to contact a power supply during a second state of operation, wherein the contact occurs at ambient temperature, exterior the vacuum chamber upon removal of the vacuum cap.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

DRAWINGS

These and other features, aspects, and advantages of the present disclosure will become better understood when the following detailed description is read with reference to the accompanying drawings in which like characters represent like parts throughout the drawings, wherein.

Figure 1:
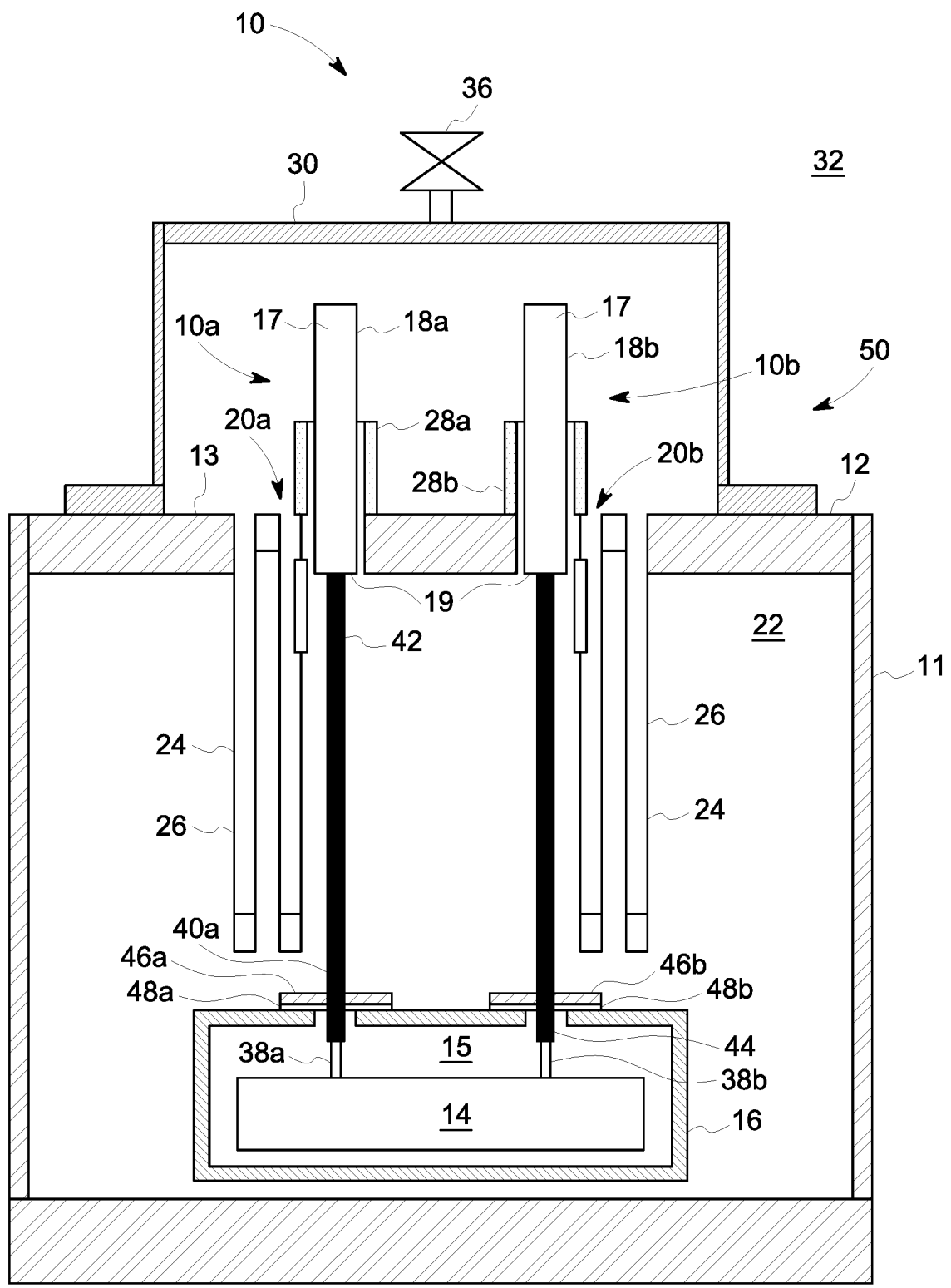
FIG. 1 is a diagram of a current lead assembly for a superconducting magnet in a first state of operation, in accordance with one embodiment of the present disclosure.

Repeat use of reference characters in the present specification and drawings is intended to represent the same or analogous features or elements of the embodiments shown.

DETAILED DESCRIPTION

Embodiments disclosed herein provide a current lead assembly for a conduction cooled superconducting magnet where connection of the current leads for supplying power to the superconducting magnet occurs at ambient temperature for a period of time, for example, during ramp of the superconducting magnet. According to embodiments of the invention, the current lead assembly includes a current lead contact that penetrates partially into vacuum chamber. The current lead contact is disposed partially within the vacuum chamber via a through hole, such that a first end of the current lead contact remains outside the vacuum chamber. The current lead contact is coupled to a magnet lead of the superconducting magnet via an internal lead. A vacuum cap is removably disposed on an outer surface of the vacuum chamber to encompass the first end of the current lead contact in a vacuum during a normal state of operation. The vacuum cap is removed during a ramp up of the superconducting magnet, to provide connection of the current lead contact to a power supply at ambient temperature. Embodiments of the current lead assembly provide for connection at ambient temperature (room temperature for example) to enable a high current ranging from as much as 500 Amps and more to be supplied to the superconducting magnet to ramp the magnet while maintaining minimum heat load to the magnet.

Unless defined otherwise, technical and scientific terms used herein have the same meaning as is commonly understood by one of ordinary skill. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and terms such as "front", "back", "bottom", and/or "top", unless otherwise noted, are merely used for convenience of description, and are not limited to any one position or spatial orientation. Moreover, the terms "coupled" and "connected" are not intended to distinguish between a direct or indirect coupling/connection between two components. Rather, such components may be directly or indirectly coupled/connected unless otherwise indicated.

Referring to FIG. 1, a diagram of a current lead assembly 10 including a plurality of current leads 10a, 10b according to an embodiment of the disclosure is shown. It is noted that while two current leads 10a, 10b are illustrated as coupled to a superconducting magnet 14 in this particular embodiment, any number of leads may be coupled to the superconducting magnet 14 for the purpose of applying a current to the superconducting magnet 14, such as during ramping. A vacuum chamber 12 houses the superconducting magnet 14, a thermal shield 16 cooled by a cryocooler (not shown), and portions of the current leads 10a, 10b, as described herein. The superconducting magnet 14 is usually cooled to a temperature of about 4K, while the thermal shield 16 is usually cooled to a temperature of about 50K. However, embodiments are not limited to these exemplary temperatures and other temperatures are contemplated.

The current lead assembly 10 includes a first current lead contact 18a and a second current lead contact 18b, each extending at least partially into the vacuum chamber 12 via a respective through hole 20a, 20b in the vacuum chamber 12. The vacuum chamber 12 comprises a housing 11 enclosing an interior volume 22. Each of the first and second current lead contacts 18a, 18b are disposed so as to sealably penetrate the vacuum chamber 12 via the respective through holes 20a, 20b and position a first end 17 of each the first and second current lead contacts 18a, 18b outside the vacuum chamber 12 and a second end 19 of each the first and second current lead contacts 18a, 18b inside the vacuum chamber 12.

A vacuum seal is formed between the current lead contact 18a and the vacuum chamber 12 via a vacuum boundary wall 24 and an insulator 28a. Similarly, a vacuum seal is formed between the current lead contact 18b and the vacuum chamber 12 via the vacuum boundary wall 24 and an insulator 28b. In the illustrated embodiment, the vacuum boundary wall 24 is defined by a reentrant concentric tube assembly, comprised of plurality of reentrant concentric tubes, generally referenced 26. The vacuum boundary wall 24 is provided to maintain the vacuum within the vacuum chamber 12 and reduce the heat leak from the room temperature vacuum chamber 12 to the current lead contacts 18a, 18b, when the vacuum cap (described presently) is in place and the current lead contacts 18a, 18b are cold. The insulators 28a and 28b, such as a plastic or a ceramic, are included to additionally provide electrical insulation between the vacuum boundary wall 24 and each of the first current lead contact 18a and the second current lead contact 18b, respectively.

A vacuum cap 30 is provided during a first state of operation 50, and more particularly, during a normal state of operation in which ramping of the superconducting magnet 14 does not take place, as illustrated in FIG. 1. The vacuum cap 30 is removably disposed on an outer surface 13 of the vacuum chamber 12, in a manner to encompass a first end 17 of each of the first and second current lead contacts 18a, 18b within a vacuum. More particularly, the vacuum cap 30 is removably disposed on the outer surface 13 of the vacuum chamber 12 via vacuum seal, such as an O-ring. The vacuum cap 30 provides minimization, if not elimination, of the formation of ice about the first ends 17 of each of the first and second current lead contacts 18a, 18b during the first state of operation 50. The vacuum cap 30 further provides elimination of gaseous conductive heat load to the thermal shield 16 when the vacuum cap 30 is removed.

Examples of materials for the vacuum cap 30 include materials that are mechanically robust against atmospheric pressure, such as stainless steel. Other suitable materials can be used.

The vacuum cap 30 provides for a vacuum to be pulled about the first and second current lead contacts 18a, 18b and the vacuum boundary wall 24, via a vacuum port 36, to reduce the convective heat load to the thermal shield 16 during the first state of operation. The vacuum cap 30 is removed during a second state of operation 52, and more particularly during a ramping state of operation, wherein a current is provided to the superconducting magnet 14, such as illustrated in FIG. 2, described presently.

Figure 2:
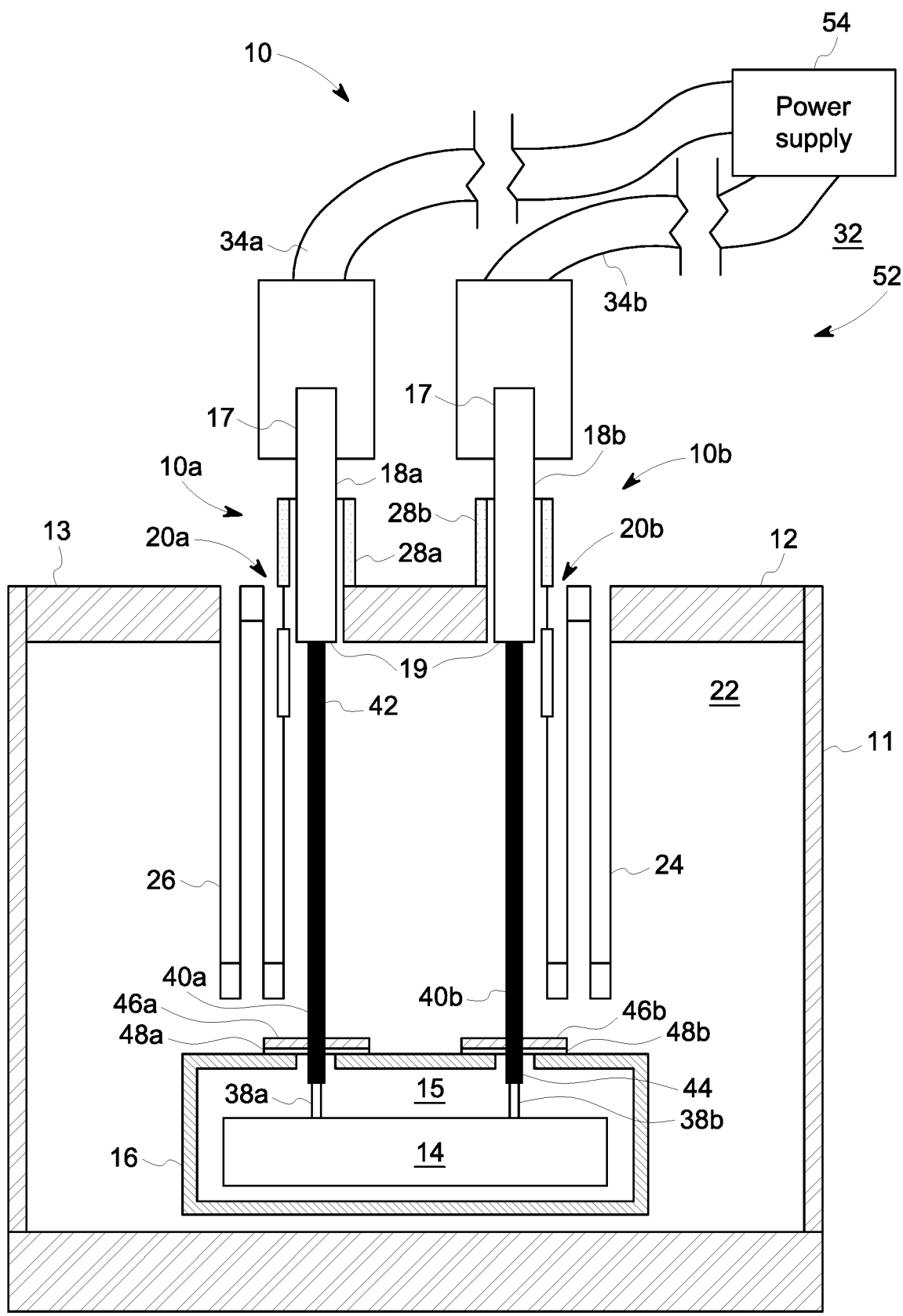
FIG. 2 is a diagram of the current lead assembly for a superconducting magnet of FIG. 1 in a second state of operation, in accordance with one embodiment of the present disclosure.

Referring now to FIG. 2, illustrated is the current lead assembly subsequent to removal of the vacuum cap 30 (FIG. 1 during a second state of operation 52. During this second state of operation 52, a first power cable 34a is connected to the first end 17 of the first current lead contact 18a and a second power cable 34b is connected to the second current lead contact 18b to energize the cryogenic apparatus, and more particularly the superconducting magnet 14. As illustrated, this electrical connection of the power supply 54 to the first end 17 of each of the first and second current lead contacts 18a, 18b is outside the vacuum chamber 12. Subsequent to energization, the vacuum cap 30 (FIG. 1) is positioned in place relative to the outer surface 13 of the vacuum chamber 12, as illustrated in FIG. 1, to sealingly encompass the first end 17 of each of the first and second current lead contacts 18a, 18b. The vacuum cap 30 provides for the removal of air, and thus a vacuum to be pulled about the first and second current lead contacts 18a, 18b and the vacuum boundary wall 24, via the vacuum port 36, to again reduce the convective heat load to the thermal shield 16 during the first state of operation.

Referring again to FIG. 1, in addition to FIG. 2, the first current lead contact 18a of the current lead assembly 10 is coupled to a first magnet lead 38a via a first internal lead 40a. The second current lead contact 18b of the current lead assembly 10 is coupled to a second magnet lead 38b via a second internal lead 40b. More specifically, each of the first and second current lead contacts 18a, 18b are coupled to a the first and second internal lead 40a, 40b, respectively, at a first end 42 via one of a female configured coupling or a male configured coupling, and may further include soldering of the first end 42 of the first and second internal lead 40a, 40b and the first and second current lead contacts 18a, 18b, respectively. The first and second magnet leads 38a, 38b are coupled to a second end 44 of each of the first and second internal lead 40a, 40b via one of a female configured coupling or a male configured coupling, and may further include soldering of the first and second internal lead 40a, 40b and the first and second magnet leads 38a, 38b, respectively.

A first thermal station 46a that receives the first internal lead 40a is secured (e.g., bolted) to the thermal shield 16 through an electrical insulation layer 48a. A second thermal station 46b that receives the second internal lead 40b is secured (e.g., bolted) to the thermal shield 16 through an electrical insulation layer 48b. The first and second electrical insulation layer 48a, 48b have a high thermal conductance so that the temperature of the thermal stations 46a, 46b are close to that of the thermal shield 16. Examples of materials for the electrical insulation layers 48a, 48b include Kapton with vacuum grease, or filled epoxy with glass. Other suitable materials can be used.

The first and second internal leads 40a, 40b are selected to minimize the heat load to the thermal shield 16 that results from the connection of the first and second current lead contacts 18a, 18b to the first and second power cables 34a, 34b, respectively, to power the superconducting magnet 14, even with supply currents of 500 Amps-1000 Amps and more. More particularly, the characteristics of the first and second internal leads 40a, 40b such as material, length, diameter, area, ratio of area to length, for example, are selected to minimize heat conduction and heat generation by current. The first and second internal leads 40a, 40b may be a copper or brass cable or wire, for example, and may be rigid or flexible. The first and second internal leads 40a, 40b enable connection to the power supply 54 via the first and second power cables 34a and 34b, respectively, at ambient temperature with minimal heat load or transfer to the low temperature or superconducting temperature of the superconducting magnet 14. In an embodiment, the power supply 54 is configured to supply a current in a range from 500 amperes to at least 1000 amperes to the superconducting magnet 14 via connection of the first and second magnet leads 38a, 38b with the first and second current lead contact 18a, 18b. respectively.

Superconducting magnets benefit from higher currents because larger superconductor wires are more cost effective in labor and material than smaller wires to fabricate superconducting coils. More particularly, the unit cost of larger wire per ampere meter used for higher current is lower than the smaller wire, which is typically used for lower current such as 100-200 Amps. In addition, fewer turns are required to wind the coil of the magnet. To date, these higher currents are supplied in superconducting magnets that are in a helium vapor or bath environment and not in a vacuum environment. The embodiments disclosed herein enable use of high currents in a vacuum environment for a superconducting magnet by minimizing the heat load to the thermal shield 16.

In addition, current lead assemblies in state of the art conduction cooled superconducting magnets make contact at low temperature. Contact at low temperature, such as 50° K and below, results in high resistance and high heat load because good contact is difficult to achieve since the contacts are very cold, rigid, contaminated, and have little compliance which makes it difficult to establish electrical contact. In the embodiments disclosed herein, electrical contact of the superconducting magnet 14 to the power supply 54 via the first and second power cables 34a, 34b is made outside of the vacuum chamber 12 and at ambient temperature so that by applying pressure at the contact point between each of the first and second current lead contact 18a, 18b and a respective power cable 34a, 34b, a very good electrical contact is established in light of clean contacts and very low contact resistance.

Thermal isolation achieved by providing for the electrical connection between the first and second power cables 34a, 34b and the first and second current lead contact 18a, 18b, respectively, outside of the vacuum chamber 12 enables the superconducting magnet 14 to be maintained at low temperature of about 50 K. When the first and second power cables 34a, 34b are disengaged from the first and second current lead contacts 18a, 18b, and the vacuum cap 30 (FIG. 1) is positioned in place relative to the vacuum chamber 12 and a vacuum pulled, so as to sealingly encompass the portion of each of the first and second current lead contacts 18a, 18b extending outside the vacuum chamber 12, the first and second current lead contacts 18a, 18b are cold. More particularly, the first and second current lead contacts 18a, 18b are cold in that they are coupled to the superconducting magnet 14 via the first and second internal leads 40a, 40b and the first and second magnet leads 38a, 38b. However, when the vacuum cap 30 is removed and contact is established between the first and second power cables 34a, 34b and the first and second current lead contacts 18a, 18b, the first and second current lead contacts 18a, 18b warm up to ambient temperature where a good electrical connection occurs and starts conducting heat and electricity. By forming the electrical connections outside of the vacuum chamber 12, any heat load is substantially eliminated from going into a cryogenic area 15 of the thermal shield 16, within the vacuum chamber 12. When energizing of the superconducting magnet 14 is complete and contact between the respective first and second current lead contacts 18a, 18b and the first and second power cables 34a, 34b are broken, the vacuum cap 30 is again positioned relative to the vacuum chamber 12 and a vacuum pulled, providing first and second current lead contacts 18a and 18 to cool down to a cold temperature again.

Figure 3:
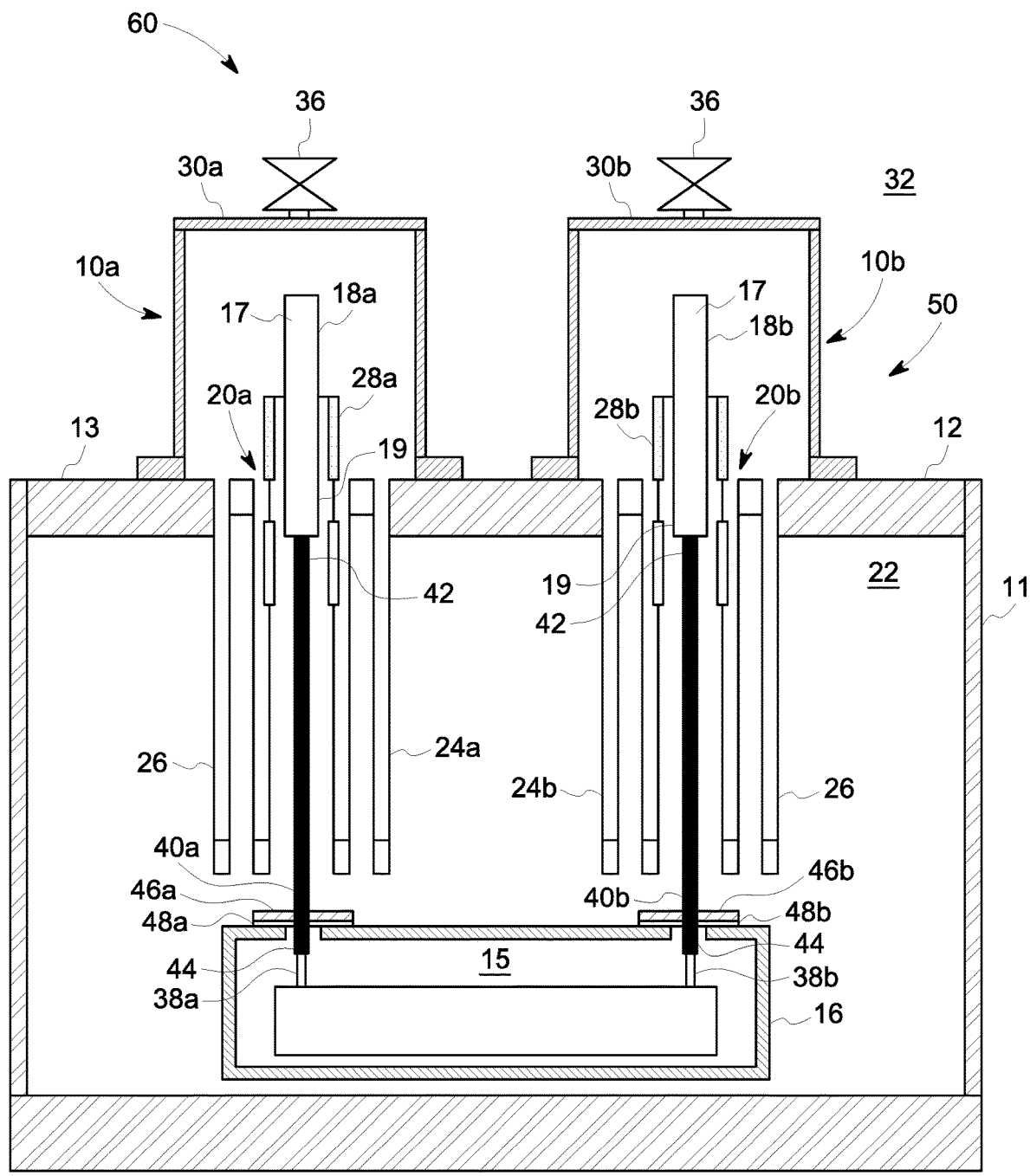
FIG. 3 is a diagram of another embodiment of a current lead assembly for a superconducting magnet in a first state of operation, in accordance with one embodiment of the present disclosure.
Figure 4:
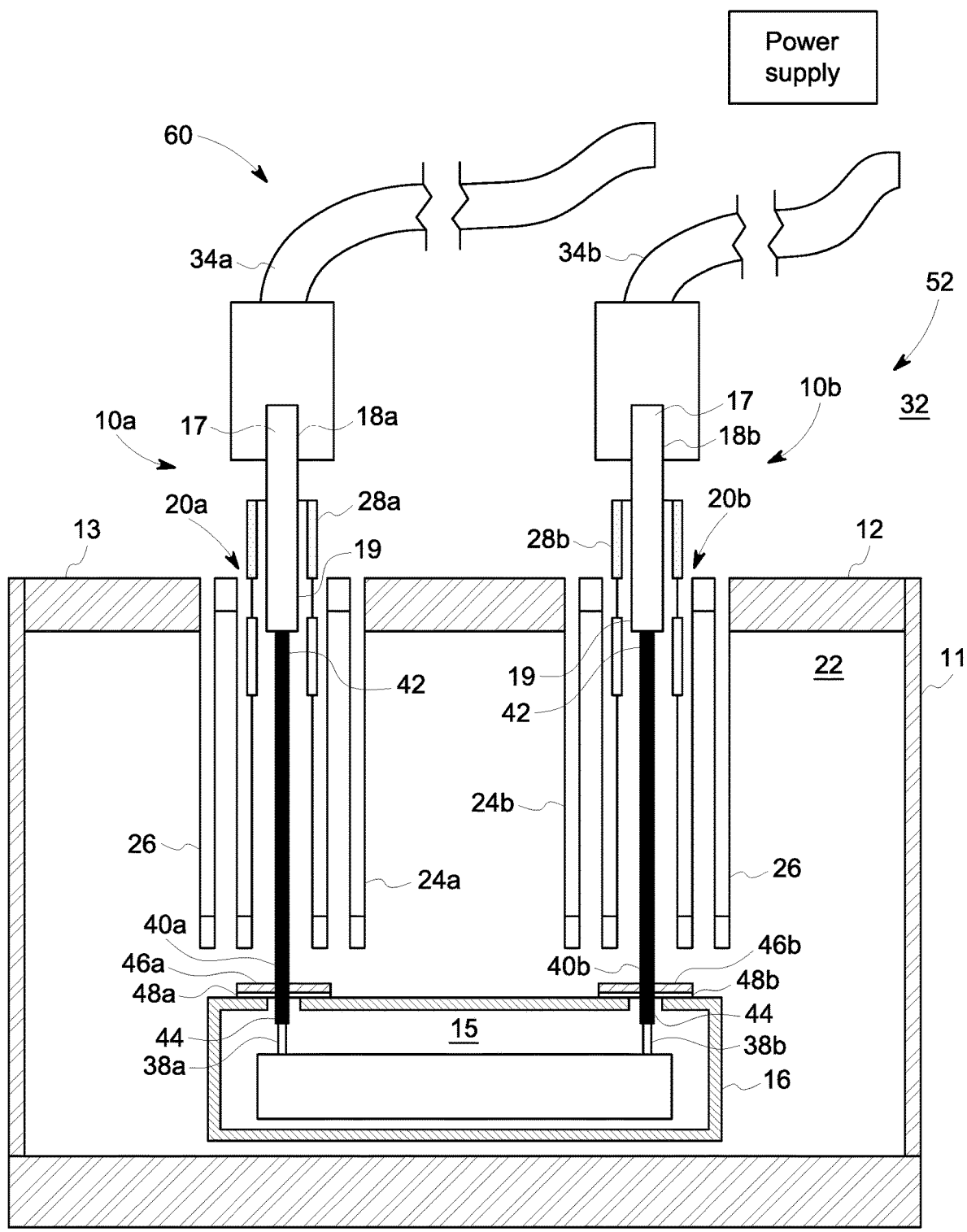
FIG. 4 is a diagram of a current lead assembly for a superconducting magnet of FIG. 3 in a second state of operation, in accordance with one embodiment of the present disclosure.

Referring now to FIGS. 3 and 4, a diagram of a current lead assembly 60 according to another embodiment of this disclosure is shown, including a first current lead 10a and a second current lead 10b, generally similar to first and second current leads 10a, 10b of FIGS. 1 and 2. In contrast to the previous current lead assembly 10 of FIGS. 1 and 2, in this particular embodiment the assembly 60 includes a plurality of vacuum boundary walls and a plurality of vacuum caps for placement during the first state of operation 50. It is again noted that repeat use of reference characters is intended to represent the same or analogous features or elements of the embodiments shown throughout. In addition, it is noted that while two current leads 10a, 10b, each surrounded by a vacuum boundary wall 24 and enclosed therein a vacuum cap 30a, 30b, respectively, are illustrated as coupled to the superconducting magnet 14 in this particular embodiment, any number of leads, each having a vacuum boundary wall and vacuum cap disposed relative thereto, may be coupled to the superconducting magnet 14 for the purpose of applying a current to the superconducting magnet 14, such as during ramping. In the embodiment of FIGS. 3 and 4, a vacuum chamber 12 houses the superconducting magnet 14, a thermal shield 16 cooled by a cryocooler (not shown), and the first and second current leads 10a, 10b.

As stated, in this particular embodiment, a vacuum seal is formed between the current lead contact 18a and the vacuum chamber 12 via a first vacuum boundary wall 24a and an insulator 28a. Similarly, a vacuum seal is formed between the current lead contact 18b and the vacuum chamber 12 via a second vacuum boundary wall 24b and an insulator 28b. In the illustrated embodiment, each of the first and second vacuum boundary walls 24a, 24b is defined by a reentrant concentric tube assembly, comprised of plurality of reentrant concentric tubes, generally referenced 26a, 26b, respectively, and referred to herein as first plurality of reentrant concentric tubes 26a and second plurality of reentrant concentric tubes 26b. The vacuum boundary walls 24a, 24b are provided to maintain the vacuum within the vacuum chamber 12, about each current lead assembly 10a, 10b, and reduce the heat leak from the room temperature vacuum chamber 12 to the current lead contacts 18a, 18b, when a respective vacuum cap (described presently) is in place and the current lead contacts 18a, 18b are cold. The insulators 28a and 28b, such as a plastic or a ceramic, are included to additionally provide electrical insulation between each of the vacuum boundary walls 24a, 24b and each of the first current lead contact 18a and the second current lead contact 18b, respectively.

Referring more particularly to FIG. 3, a first vacuum cap 30a and a second vacuum cap 30b are provided during a first state of operation 50, and more particularly, during a normal state of operation in which ramping of the superconducting magnet 14 does not take place. Each of the first vacuum cap 30a and the second vacuum cap are removably disposed on an outer surface 13 of the vacuum chamber 12. The first vacuum cap 30a is removably disposed on the outer surface 13 of the vacuum chamber 12 in a manner to encompass a first end 17 of the first current lead contact 18a within a vacuum. Similarly, the second vacuum cap 30b is removably disposed on the outer surface 13 of the vacuum chamber 12 in a manner to encompass a first end 17 of the second current lead contact 18b within a vacuum.

As in the previous embodiment, the first and second vacuum caps 30a, 30b provide elimination of gaseous conductive heat load to the thermal shield 16 when the vacuum cap 30 is removed. The first and second vacuum caps 30a, 30b are removed during a second state of operation 52, and more particularly during a ramping state of operation, wherein a current is provided via a power supply 54 and first and second power cables 34a, 34b to the superconducting magnet 14, such as illustrated in FIG. 4. In contrast to the embodiment of FIG. 1, use of individual vacuum caps, and more particularly the first and second vacuum caps 30a, 30b in the embodiment of FIG. 3 to provide separate vacuum seals about each of the first and second current lead contacts 18a, 18b requires less overall space, may be easier and more cost effective to manufacture than the use of a single vacuum cap enclosing the first ends 17 of both the first and second current lead contacts 18a, 18b, as illustrated in FIG. 1.

It is noted that the embodiment of FIGS. 3 and 4 is otherwise similarly configured to the embodiment of FIGS. 1 and 2 as previously described, except for the noted use of multiple vacuum boundary walls and multiple vacuum caps, and more particularly use of the vacuum boundary walls 24a, 24b, defined by a first and second reentrant concentric tube assemblies 26a, 26b, respectively and the multiple first and second vacuum caps 30a, 30b.

Figure 5:
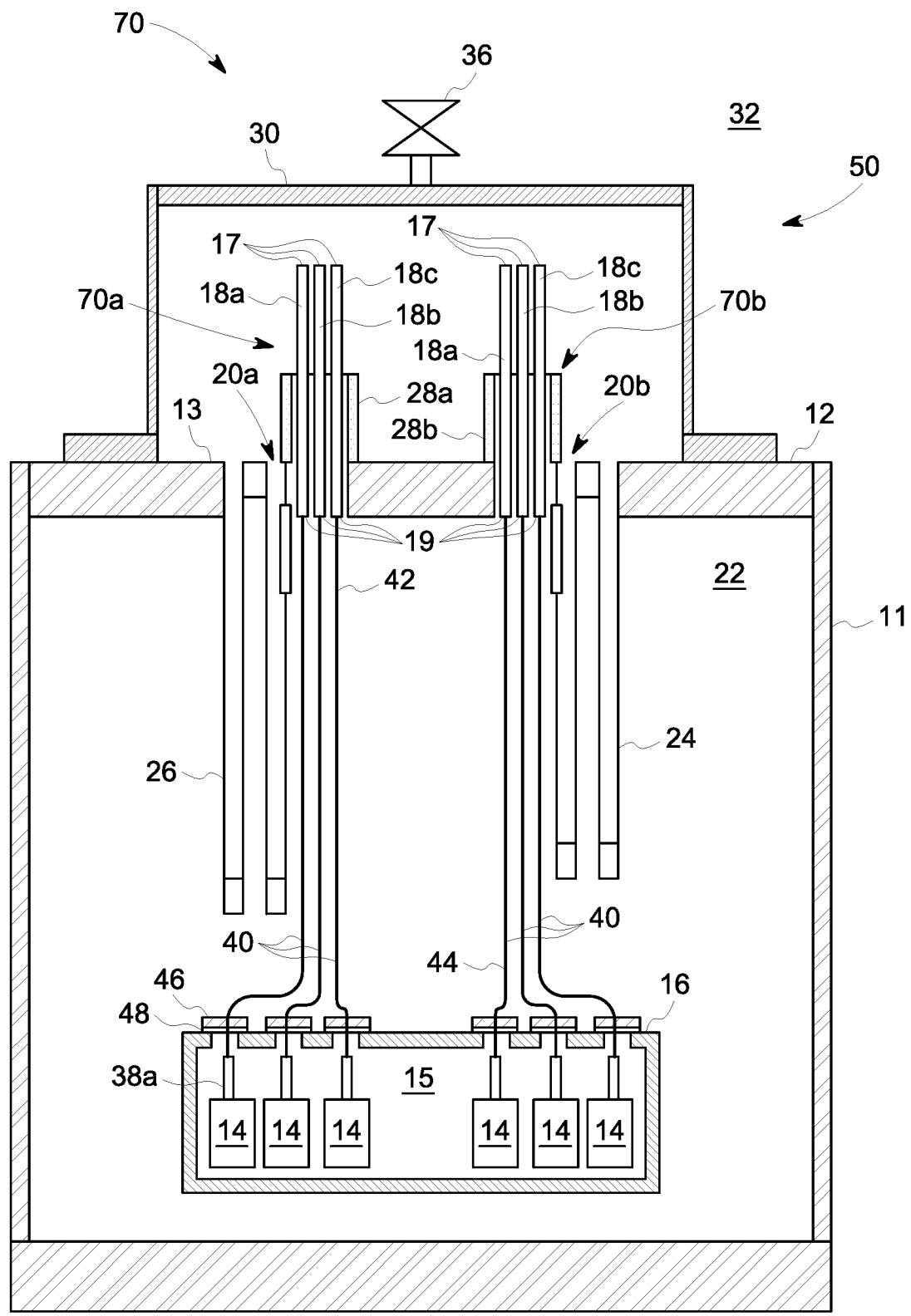
FIG. 5 is a diagram of another embodiment of a current lead assembly for a superconducting magnet in a first state of operation, in accordance with one embodiment of the present disclosure.
Figure 6:
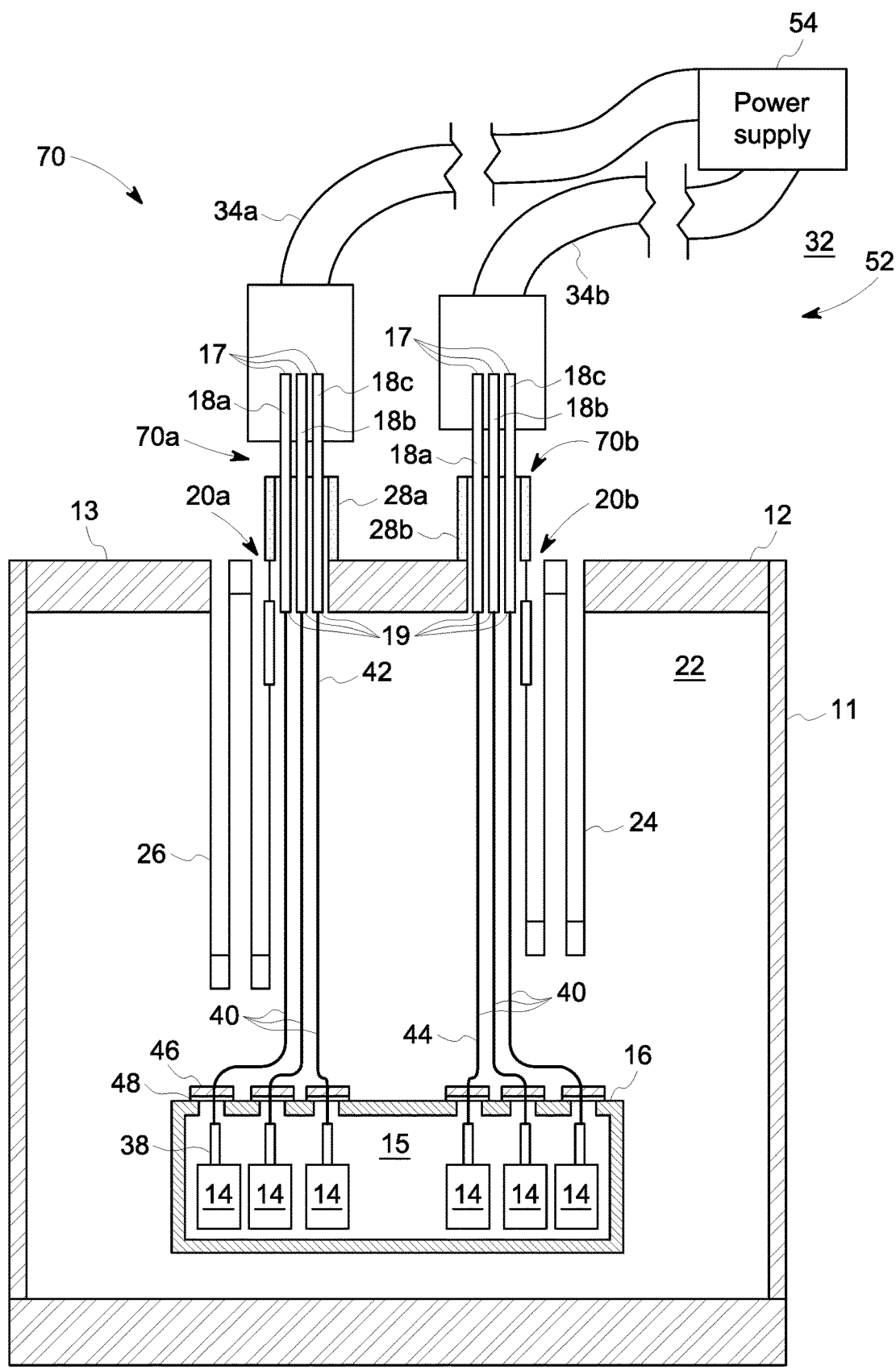
FIG. 6 is a diagram of a current lead assembly for a superconducting magnet of FIG. 5 in a second state of operation, in accordance with one embodiment of the present disclosure.

Referring now to FIGS. 5 and 6, a diagram of a current lead assembly 70 according to another embodiment of this disclosure is shown. In contrast to the previous current lead assemblies of FIGS. 1-4, in this particular embodiment a plurality of superconducting magnets 14 are energized by the current lead assembly 70 including a plurality of current leads 70a, 70b, wherein each current lead 70a, 70b includes a plurality of current lead contacts. It is noted that while two current leads 70a, 70b are illustrated as coupled to the plurality of magnets 14 in this particular embodiment, any number of leads, inclusive of any number of current lead contacts (as described presently) may be coupled to any number of magnets 14 for the purpose of applying a current to the plurality of magnets 14, such as during ramping.

In the embodiment of FIGS. 5 and 6, a vacuum chamber 12 houses the plurality of superconducting magnets 14, a thermal shield 16 cooled by a cryocooler (not shown), and the first and second current leads 70a, 70b. The current lead assembly 70, and more particularly, each of the first current lead 70a and the second current lead 70b includes a plurality of current lead contacts 18a, 18b, 18c, each of the first current lead 70a and the second current lead 70b extending into the vacuum chamber 12 via a respective through hole 20a, 20b in the vacuum chamber 12. In this particular embodiment, each current lead 70a, 70b, includes three current lead contacts 18a, 18b, 18c, but may be modified to include a fewer or greater number of contacts dependent upon the number of superconducting magnets 14 included in the assembly 70. Each current lead contact 18a, 18b, 18c is disposed so as to sealably penetrate the vacuum chamber 12 via a through hole 20a, 20b and position a first end 17 of each the current lead contacts 18a, 18b, 18c outside the vacuum chamber 12 and a second end 19 of each the current lead contacts 18a, 18b, 18c inside the vacuum chamber 12.

A vacuum seal is formed between the plurality of current lead contacts 18a, 18b, 18c and the vacuum chamber 12 via a vacuum boundary wall 24 and a plurality of insulators 28. In the illustrated embodiment the vacuum boundary wall 24 is defined by a reentrant concentric tube assembly, comprised of plurality of reentrant concentric tubes, and generally referenced 26. The vacuum boundary wall 24 is provided to maintain the vacuum within the vacuum chamber 12 and reduce the heat leak from the room temperature vacuum chamber 12 to the thermal shield 16. The plurality of insulators 28a, 24b, such as plastic or ceramic, are included to additionally provide electrical insulation between the vacuum boundary wall 24 and a respective plurality of current lead contacts 18a, 18b, 18c. A vacuum cap 30 is provided during a first state of operation 50 as illustrated in FIG. 5, and more particularly, during the time in which ramping of the plurality of magnets 14 does not take place, in a manner to encompass a first end 17 of each of the plurality of current lead contacts 18a, 18b, 18c from surrounding ambient air 32. The vacuum cap 30 is removably disposed on an outer surface 13 of the vacuum chamber 12. The vacuum cap 30 provides elimination of gaseous conductive heat load to thermal shield 16. Similar to the previous embodiment when the vacuum cap 30 is removed, the vacuum cap 30 is removed during a second state of operation 52, and more particularly during a ramping state of operation, wherein a current is provided via a power supply 54 to the plurality of magnets 14, such as illustrated in FIG. 6.

During this second state of operation 52, a first power cable 34a is connected to the first ends 17 of each of the plurality of current lead contacts 18a, 18b, 18c of the first current lead 70a and a second power cable 34b is connected to the first ends 17 of each of the plurality of current lead contacts 18a, 18b, 18c of the second current lead 70b to energize the cryogenic apparatus, and more particularly the plurality of magnets 14. Similar to the previously described embodiments, this electrical connection of the power supply 54 to the plurality of current lead contacts 18a, 18b, 18c is outside the vacuum chamber 12. Subsequent to energization, the vacuum cap 30 is positioned in place relative to an outer surface 13 of the vacuum chamber 12, as illustrated in FIG. 5, to sealingly encompass the first ends 17 of each of the plurality of current lead contacts 18a, 18b, 18c. The vacuum cap 30 provides for the removal of air, and thus a vacuum to be pulled about the plurality of current lead contacts 18a, 18b, 18c and the vacuum boundary wall 24, via a vacuum port 36, to again reduce the convective heat leak to the thermal shield 16 during the first state of operation 50.

In this particular embodiment, each of the current lead contacts 18a, 18b, 18c of each of the first current lead assembly 70a and the second current lead assembly 70b is coupled to a magnet lead 38 of a single magnet 14 of the plurality of magnets 14 via an internal lead 40. More specifically, each current lead contact 18a, 18b, 18c is coupled to a first end 42 of a single internal lead 40 via a female configured coupling or a male configured coupling, and may further include soldering of the first end 42 of the internal lead 40 and the respective current lead contact 18a, 18b, 18c. The magnet lead 38 of a respective magnet 14 is coupled to a second end 44 of the internal lead 40 via a female configured coupling or a male configured coupling, and may further include soldering of the internal lead 40 and the respective current lead contact 18a, 18b, 18c. Accordingly, each of the plurality of magnets 14 is coupled to one of the plurality of current lead contacts 18a, 18b, 18c via an internal lead 40.

Each of the plurality of internal leads 40 is received by a thermal station 46 secured (e.g., bolted) to the thermal shield 16 through an electrical insulation layer 48. Each of the electrical insulation layers 48 is configured as previously described with regard to the embodiment of FIGS. 1 and 2.

Similar to the previous embodiments, the plurality of internal leads 40 enable connection to the power supply 54 via the first and second power cables 34a and 34b, respectively, at ambient temperature with minimal heat load or transfer to the low temperature or superconducting temperature of the plurality of superconducting magnets 14.

Similar to the previous embodiments, in this particular embodiment, electrical contact of each of the plurality of magnets 14 to the power supply 54 via the first and second power cables 34a, 34b is made outside of the vacuum chamber 12 and at ambient temperature so that by applying pressure at the contact point between each of the plurality of current lead contacts 18a, 18b, 18c and a respective power cable 34a, 34b, a very good electrical contact is established in light of clean contacts and very low contact resistance.

When the first and second power cables 34a, 34b are disengaged from the plurality of current lead contacts 18a, 18b, 18c, and the vacuum cap 30 is positioned in place relative to the vacuum chamber 12 and a vacuum pulled so as to sealingly encompass the first end 17 of each of the plurality of current lead contacts 18a, 18b, 18c extending outside the vacuum chamber 12, the plurality of current lead contacts 18a, 18b, 18c are cold in that they are coupled to the plurality of superconducting magnets 14 via the plurality of internal leads 40. However, when the vacuum cap 30 is removed and contact is established between the first and second power cables 34a, 34b and the plurality of current lead contacts 18a, 18b, 18c, the plurality of current lead contacts 18a, 18b, 18c warm up to ambient temperature where a good electrical connection occurs and starts conducting heat and electricity. Similar to the previous embodiment, by forming the electrical connections outside of the vacuum chamber 12, any additional heat load is substantially eliminated from going into a cryogenic area 15 of the thermal shield 16, within the vacuum chamber 12.

Figure 7:
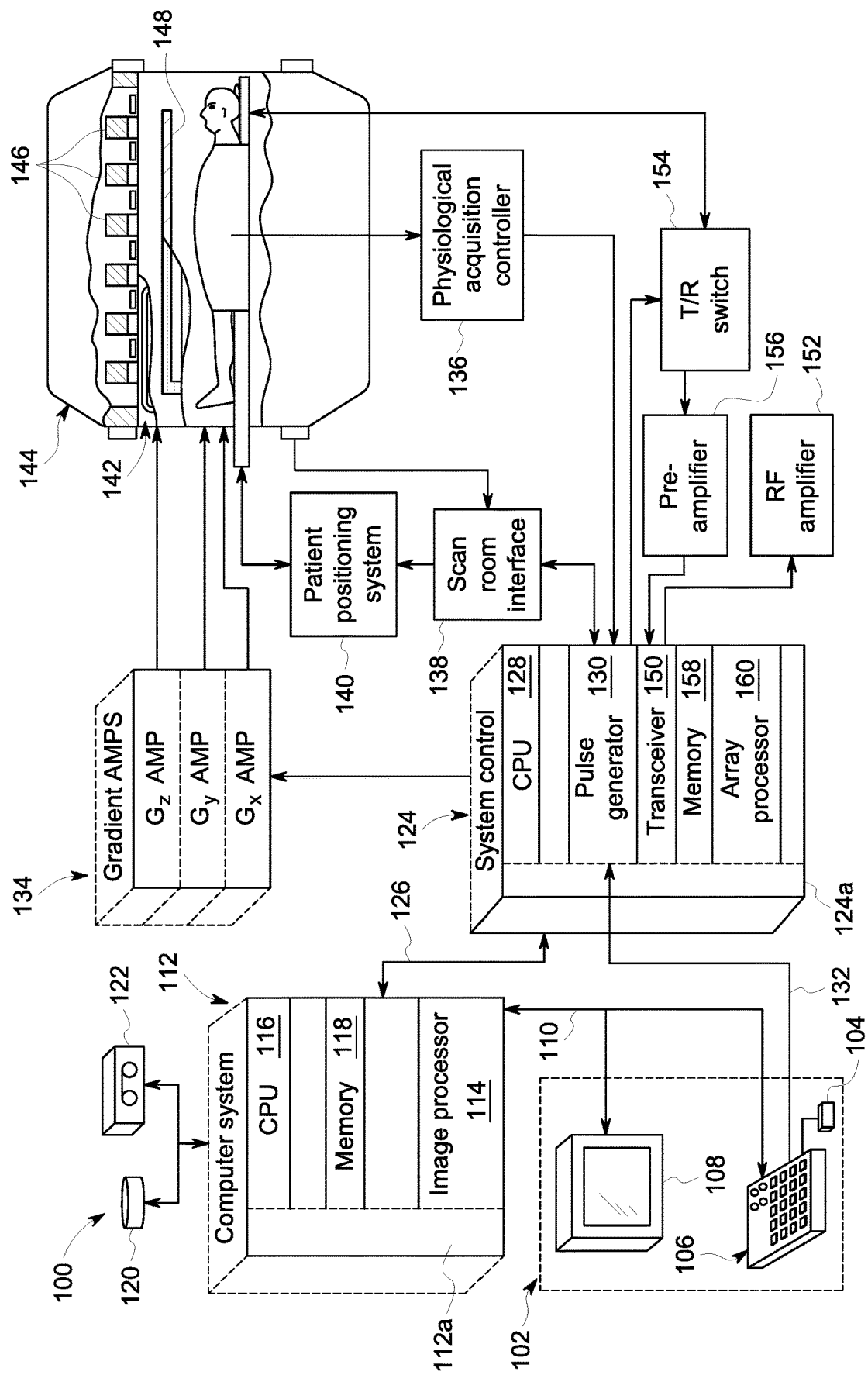
FIG. 7 is a block diagram of an imaging system having a superconducting magnet including the current lead assembly disclosed herein, in accordance with one embodiment of the present disclosure.

Referring now to FIG. 7, a magnetic resonance imaging (MM) system is shown incorporating the current lead assembly 10, 60, 70 according to embodiments of the invention. MRI systems typically use superconducting magnets, often with multiple coils to generate the uniform magnetic field.

Exemplary superconducting magnet systems operating in MRI systems require occasional ramping of the superconducting magnet to charge the magnet for use of the MRI system. After the superconducting magnet is ramped, the current supply used for the magnet ramping is disconnected and is not needed until further magnet ramping is necessary, such as for demagnetization of the superconducting magnet or for remagnetization of the superconducting magnet after, for instance, scheduled service, a magnet quench, and the like.

The operation of the MRI system 100, shown in FIG. 7, is controlled from an operator console 102 which includes a keyboard or other input device 104, a control panel 106, and a display screen 108. The input device 104 can include a mouse, joystick, keyboard, track ball, touch activated screen, light wand, voice control, or any similar or equivalent input device, and may be used for interactive geometry prescription. The operator console 102 communicates through a link 110 with a separate computer system 112 that enables an operator to control the production and display of images on the display screen 108. The computer system 112 includes a number of modules which communicate with each other through a backplane 112a. These include an image processor module 114, a CPU module 116 and a memory module 118, known in the art as a frame buffer for storing image data arrays. The computer system 112 is linked to disk storage 120 and removable storage 122 for storage of image data and programs, and communicates with a separate system control 124 through a high speed serial link 126.

The system control 124 includes a set of modules connected together by a backplane 124a. These include a CPU module 128 and a pulse generator module 130 which connects to the operator console 102 through a serial link 132. It is through link 132 that the system control 124 receives commands from the operator to indicate the scan sequence that is to be performed. The pulse generator module 130 operates the system components to carry out the desired scan sequence and produces data which indicates the timing, strength and shape of the RF pulses produced, and the timing and length of the data acquisition window. The pulse generator module 130 connects to a gradient amplifier system 134, to indicate the timing and shape of the gradient pulses that are produced during the scan. The pulse generator module 130 can also receive patient data from a physiological acquisition controller 136 that receives signals from a number of different sensors connected to the patient, such as ECG signals from electrodes attached to the patient. And finally, the pulse generator module 130 connects to a scan room interface circuit 138 which receives signals from various sensors associated with the condition of the patient and the magnet system. It is also through the scan room interface circuit 138 that a patient positioning system 140 receives commands to move the patient to the desired position for the scan.

The gradient waveforms produced by the pulse generator module 130 are applied to the gradient amplifier system 134 having Gx, Gy, and Gz amplifiers. Each gradient amplifier excites a corresponding physical gradient coil in a gradient coil assembly, generally designated 142, to produce the magnetic field gradients used for spatially encoding acquired signals. The gradient coil assembly 142 forms part of a magnet assembly 144 which includes a polarizing magnet 146 and a whole-body RF coil 148, in addition to the current lead assembly 10, 60, 70 described herein. A transceiver module 150 in the system control 124 produces pulses which are amplified by an RF amplifier 152 and coupled to the RF coil 148 by a transmit/receive switch 154. The resulting signals emitted by the excited nuclei in the patient may be sensed by the same RF coil 148 and coupled through the transmit/receive switch 154 to a preamplifier 156. The amplified MR signals are demodulated, filtered, and digitized in the receiver section of the transceiver module 150. The transmit/receive switch 154 is controlled by a signal from the pulse generator module 130 to electrically connect the RF amplifier 152 to the RF coil 148 during the transmit mode and to connect the preamplifier 156 to the RF coil 148 during the receive mode. The transmit/receive switch 154 can also enable a separate RF coil (for example, a surface coil) to be used in either the transmit or receive mode.

The MR signals picked up by the RF coil 148 are digitized by the transceiver module 150 and transferred to a memory module 158 in the system control 124. A scan is complete when an array of raw k-space data has been acquired in the memory module 158. This raw k-space data is rearranged into separate k-space data arrays for each image to be reconstructed, and each of these is input to an array processor 160 which operates to Fourier transform the data into an array of image data. This image data is conveyed through the serial link 126 to the computer system 112 where it is stored in memory, such as disk storage 120. In response to commands received from the operator console 102, this image data may be archived in long term storage, such as on the removable storage 122, or it may be further processed by the image processor module 114 and conveyed to the operator console 102 and presented on the display screen 108.

The various embodiments of the exemplary current lead assembly described hereinabove may be applicable to MRI systems. In addition, the various embodiments of the exemplary current lead assembly may be equally applicable to other related structures that require cooldown, e.g. superconducting wind applications, superconducting electrical aircraft applications, as well as for cold mass cooldown in lab test dewars.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A current lead assembly for a superconducting magnet, comprising:
   a vacuum chamber having a through hole;
   a current lead contact sealably penetrating the vacuum chamber via the through hole, the current lead contact having a first end outside the vacuum chamber and a second end inside the vacuum chamber;
   a vacuum boundary wall between the vacuum chamber and the current lead contact;
   at least one superconducting magnet arranged inside of the vacuum chamber and having a magnet lead;
   at least one internal lead having one end coupled to the magnet lead and another end coupled to the second end of the current lead contact; and
   a vacuum cap removably disposed on an outer surface of the vacuum chamber to sealingly encompass therein the first end of the current lead contact during a first state of operation,
   the first end of the current lead contact arranged to contact a power supply during a second state of operation, wherein the contact occurs at ambient temperature, exterior the vacuum chamber upon removal of the vacuum cap;

wherein the vacuum boundary wall comprises a plurality of reentrant concentric tubes.

2. The current lead assembly of claim 1, wherein the vacuum cap is removably disposed on the outer surface of the vacuum chamber upon completion of a magnet ramp operation.

3. The current lead assembly of claim 1, wherein the vacuum cap is removably disposed on the outer surface of the vacuum chamber to minimize heat conduction to the magnet lead from an ambient environment.

4. The current lead assembly of claim 1, including a plurality of superconducting magnets arranged inside of the vacuum chamber, each of the plurality of superconducting magnets having a magnet lead.

5. The current lead assembly of claim 4, comprising a plurality of internal leads each having one end coupled to the magnet lead and another end coupled to a second end of the current lead contact.

6. The current lead assembly of claim 5, including a plurality of superconducting magnets arranged inside of the vacuum chamber, each of the plurality of superconducting magnets having a magnet lead coupled to a second end of the internal lead.

7. The current lead assembly of claim 1, wherein the vacuum cap is comprised of stainless steel.

8. The current lead assembly of claim 1, further comprising a plurality of vacuum boundary walls and a plurality of vacuum caps.

9. The current lead assembly of claim 1, wherein the vacuum cap includes a vacuum port to pull a vacuum about the first end of the current lead contact.

10. The current lead assembly of claim 1, wherein the first end of the current lead contact is coupled to a power supply, and wherein a current in a range from 500 amperes to at least 1000 amperes is supplied to the at least one superconducting magnet via connection of the magnet lead with the power supply.

11. A method of fabricating a current lead assembly for a superconducting magnet, comprising:
providing a vacuum chamber comprising a housing enclosing an interior volume and having at least one through hole;
providing at least one superconducting magnet inside of the vacuum chamber and having a magnet lead;
arranging a current lead contact to sealingly penetrate the vacuum chamber via the through hole, wherein a first end of the current lead contact is positioned outside the vacuum chamber and a second end of the current lead contact is positioned inside the vacuum chamber;
arranging a reentrant concentric tube assembly providing a vacuum boundary between the vacuum chamber and the current lead contact;
attaching an internal lead between the magnet lead and the second end of the current lead contact; and
removably disposing a vacuum cap on an outer surface of the vacuum chamber to sealingly encompass the first end of the current lead contact during a first state operation and provide contact outside the vacuum chamber of the first end of the current lead contact with a power supply upon removal of the vacuum cap during a second state of operation;
wherein the vacuum cap is comprised of stainless steel.

12. The method of claim 11, wherein the first state of operation is a normal state of operation during which ramping of the at least one superconducting magnet does not take place and the second state of operation includes ramping of the at least one superconducting magnet.

13. The method of claim 11, further comprising:
arranging the vacuum cap to sealingly encompass and thermally isolate the first end of the current lead contact from ambient air upon completion of the second state of operation.

14. The method of claim 11, wherein the first end of the current lead contact is thermally isolated from ambient air outside the vacuum chamber during the first state of operation.

15. A magnetic resonance imaging (MRI) system, comprising:
at least one superconducting magnet that generates a magnetic field comprising a plurality of magnetic field gradients, the at least one superconducting magnet having a magnet lead and arranged inside of a vacuum chamber enclosing a vacuum space and comprising a through hole;
a current lead contact sealably penetrating the vacuum chamber via the through hole, the current lead contact have a first end outside the vacuum chamber and a second end inside the vacuum chamber;
a reentrant concentric tube assembly providing a vacuum boundary between the vacuum chamber and the current lead contact;
at least one internal lead having one end coupled to the magnet lead and another end coupled to the second end of the current lead contact; and
a vacuum cap removably disposed on an outer surface of the vacuum chamber to sealingly encompass therein the first end of the current lead contact during a first state of operation,
the first end of the current lead contact arranged to contact a power supply during a second state of operation, wherein the contact occurs at ambient temperature, exterior the vacuum chamber upon removal of the vacuum cap.

16. The MRI system of claim 15, wherein the first state of operation is a normal state of operation during which ramping of the at least one superconducting magnet does not take place and the second state of operation includes ramping of the at least one superconducting magnet.

17. The MRI system of claim 15, wherein the vacuum cap provides thermal isolation of the first end of the current lead contact from ambient air outside the vacuum chamber during the first state of operation.

18. The MRI system of claim 15, wherein the vacuum cap is removably disposed on the outer surface of the vacuum chamber to form a vacuum seal about the first end of the current lead contact during the first state of operation.

19. The MRI system of claim 15, wherein the first end of the current lead contact is coupled to a power supply, and wherein a current in a range from 500 amperes to at least 1000 amperes is supplied to the at least one superconducting magnet via connection of the magnet lead with the power supply during the second stage of operation.

20. A current lead assembly for a superconducting magnet, comprising:
a vacuum chamber having a through hole;
a current lead contact sealably penetrating the vacuum chamber via the through hole, the current lead contact having a first end outside the vacuum chamber and a second end inside the vacuum chamber;
a vacuum boundary wall between the vacuum chamber and the current lead contact;
at least one superconducting magnet arranged inside of the vacuum chamber and having a magnet lead;

at least one internal lead having one end coupled to the magnet lead and another end coupled to the second end of the current lead contact; and a vacuum cap removably disposed on an outer surface of the vacuum chamber to sealingly encompass therein the first end of the current lead contact during a first state of operation, the first end of the current lead contact arranged to contact a power supply during a second state of operation, wherein the contact occurs at ambient temperature, exterior the vacuum chamber upon removal of the vacuum cap;

wherein the current lead assembly further includes a plurality of superconducting magnets arranged inside of the vacuum chamber, each of the plurality of superconducting magnets having a magnet lead.

* * * * *